(12) United States Patent
Iustin

(10) Patent No.: US 12,485,710 B2
(45) Date of Patent: Dec. 2, 2025

(54) ELECTRONIC CONTROL UNIT (ECU) AND METHOD THEREIN FOR MONITORING TIRE SENSORS IN A VEHICLE

(71) Applicant: VOLVO TRUCK CORPORATION, Gothenburg (SE)

(72) Inventor: Roman Iustin, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 70 days.

(21) Appl. No.: 18/568,605

(22) PCT Filed: Jun. 11, 2021

(86) PCT No.: PCT/EP2021/065850
§ 371 (c)(1),
(2) Date: Dec. 8, 2023

(87) PCT Pub. No.: WO2022/258202
PCT Pub. Date: Dec. 15, 2022

(65) Prior Publication Data
US 2024/0270030 A1 Aug. 15, 2024

(51) Int. Cl.
*B60C 23/04* (2006.01)

(52) U.S. Cl.
CPC ...... *B60C 23/0416* (2013.01); *B60C 23/0479* (2013.01)

(58) Field of Classification Search
CPC ............ B60C 23/0416; B60C 23/0479; B60C 23/0472
USPC ........................................................ 340/442
See application file for complete search history.

(56) References Cited

U.S. PATENT DOCUMENTS

| | | |
|---|---|---|
| 8,903,602 B2 | 12/2014 | Bailie et al. |
| 9,707,041 B2 | 7/2017 | Iustin et al. |
| 10,583,699 B2 | 3/2020 | Hassani et al. |
| 10,780,749 B2 * | 9/2020 | Hassani ............. B60C 23/0483 |
| 2004/0027241 A1 | 2/2004 | Forster |

(Continued)

FOREIGN PATENT DOCUMENTS

| | | |
|---|---|---|
| CN | 111452571 A | 7/2020 |
| EP | 3078508 A1 | 10/2016 |
| JP | H10302187 A | 11/1998 |

(Continued)

OTHER PUBLICATIONS

International Search Report and Written Opinion of the International Searching Authority in corresponding International Application No. PCT/EP2021/065850 mailed Feb. 1, 2022 (13 pages).

(Continued)

*Primary Examiner* — Eric Blount
(74) *Attorney, Agent, or Firm* — Venable LLP; Jeffri A. Kaminski

(57) ABSTRACT

An electronic control unit, ECU, for monitoring at least two tire sensors in at least two tires in a vehicle is provided. The ECU is arranged to obtain a tire sensor location of each of the at least two tire sensors relative to a tire sensor reader location on-board the vehicle. The ECU is also arranged to adapt a tire sensor interrogation time instant of each of the at least two tire sensors based on the obtained relative tire sensor location of each of the at least two tire sensors.

17 Claims, 6 Drawing Sheets

(56) References Cited

U.S. PATENT DOCUMENTS

2005/0110624 A1   5/2005  Nicot et al.
2016/0311274 A1*  10/2016 Tanno .................... B60C 23/20

FOREIGN PATENT DOCUMENTS

JP    2012126341 A    7/2012
WO    2005072993 A1   8/2005

OTHER PUBLICATIONS

Written Opinion of the International Preliminary Examining Authority in corresponding International Application No. PCT/EP2021/065850 mailed Jun. 19, 2023 (5 pages).
International Preliminary Report on Patentability in corresponding International Application No. PCT/EP2021/065850 mailed Sep. 27, 2023 (6 pages).
European Communication pursuant to Rules 161(1) and 162 EPC dated Jan. 18, 2024 in corresponding European Patent Application No. 21733764.1, 3 pages.

* cited by examiner

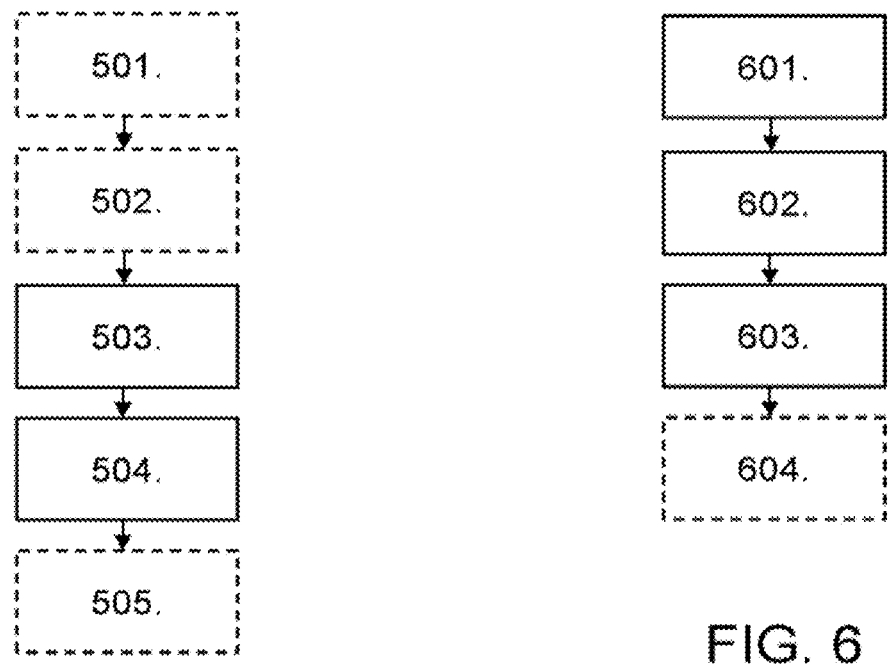
FIG. 5
FIG. 6
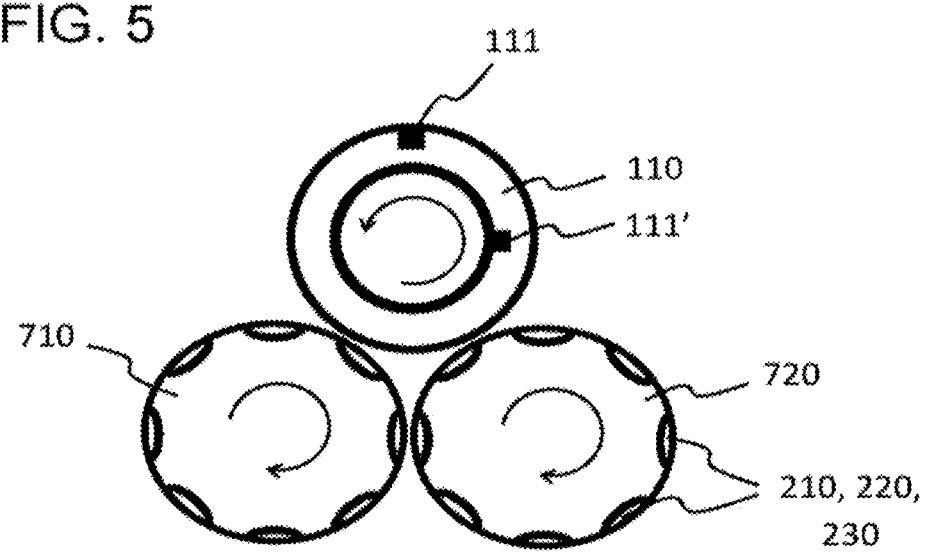
FIG. 7

(A)　　　　　　　(B)　　　　　　　(C)

(D)　　　　(E)　　　　(F)　　　　(G)

(H)　　　　(I)　　　　(J)　　　　(K)

ELECTRONIC CONTROL UNIT (ECU) AND METHOD THEREIN FOR MONITORING TIRE SENSORS IN A VEHICLE

CROSS-REFERENCE TO RELATED APPLICATIONS

This application is a U.S. National Stage application of PCT/EP2021/065850, filed Jun. 11, 2021 and published on Dec. 15, 2022, as WO 2022/258202, all of which is hereby incorporated by reference in its entirety.

TECHNICAL FIELD

Embodiments herein relate in general to tire sensors in the wheels on a vehicle. In particular, embodiments herein relate to an electronic control unit and a method therein for monitoring tire sensors in a vehicle. Also, the embodiments herein also relate to a computer program product for performing the method and a carrier of the same. Further, the embodiments herein also relate to a wheel.

BACKGROUND

In vehicles today, in particular heavy-duty vehicles such as semi-trailer vehicles or trucks for cargo transport, one or more central electronic control units, ECUs, may be implemented on-board the vehicle in order to read and collect sensor readings from various different types of sensors on-board the vehicle. These sensor readings may, for example, comprise tire pressures, temperatures and identities of tire sensors located in or on the tires of the vehicle. These types of systems are conventionally referred to a Tire Pressure Monitoring Systems, TPMS, or Tire Health Systems, THS. These systems normally employ Radio Frequency Identification, RFID, for their sensors.

In a TPMS/THS system, each tire may have one or more integrated tire sensors. Each tire sensor has unique identity, ID. After mounting of the tires, or re-mounting of the tires due to e.g. tire rotation, the TPMS/THS system, or rather the ECU, have no information about exactly where in the tire the one or more tire sensors are located. In addition, the positional relationships between the tire sensors and the ECU is not known.

Since the tire sensors normally are battery driven devices, there is a need to optimize their expected battery life-time and to obtain as low energy consumption as possible for the tire sensors.

SUMMARY

It is an object of embodiments herein to provide an electronic control unit and method therein, along with computer program product and a wheel, for monitoring tire sensors on a vehicle that seeks to mitigate, alleviate or eliminate all or at least some of the above-discussed drawbacks of presently known solutions.

US2005110624 describes a system for determining at least one parameter of at least one member rotating with respect to a fixed structure. The system comprise a synchronisation unit for activating an arrangement when its in the transmission/reception cone of a communication means.

US2004027241 describes a tire sensor that communicates to a remote interrogator in one of two modes depending on the nature of the interrogation.

EP3078508A1 describes a pneumatic tire provided with a mechanical fastener member on the inner surface of the pneumatic tire, wherein the installation position of the mechanical fastener member is easily knowable.

JP2012126341A describes a valve identification information registration system which performs easy registration operations of valve identification information.

JPH10302187A describes having transmission/reception antennas provided in the tire pass area of a vehicle travel path to learn information on tires and information-accessing to responders provided in the tires of the vehicle passing through the travel route.

WO2005/072993A1 describes remote interrogation of a vehicle wheel.

According to a first aspect of embodiments herein, the object is achieved by an electronic control unit, ECU, for monitoring at least two tire sensors in at least two tires in a vehicle. The ECU is arranged to obtain a tire sensor location of each of the at least two tire sensors relative to a tire sensor reader location on-board the vehicle. The ECU is also arranged to adapt a tire sensor interrogation time instant of each of the at least two tire sensors based on the obtained relative tire sensor location of each of the at least two tire sensors.

By adapting a tire sensor interrogation time instant based on the obtained relative tire sensor location, the ECU may ensure that transmissions from the tire sensors is only performed during optimal, or close to optimal, transmission conditions towards its tire sensor reader location. Hence, the tire sensors will not waste any energy on transmissions at times when the transmission conditions towards the ECU's tire sensor reader location is not optimal. This will lead to a lower energy consumption in the tire sensors, and consequently to an extended battery life-time of the tire sensors.

In some embodiments, the tire sensor interrogation time instant may be adapted to a time instant when the distance between the obtained relative tire sensor location and the tire sensor reader location is at, or about, a minimum. This means that a preferred tire sensor interrogation time instant may be when the tire sensor has its shortest radial distance towards the ECU's tire sensor reader location, which often provides the most advantageous transmission conditions. Here, it should also be noted that the tire sensor reader location of the ECU and the location of the ECU may be the same location, i.e. the tire sensor reader may be located in the ECU. Furthermore, an ECU may be connected to a plurality of range extenders, and thus have several tire sensor reader locations.

Optionally, according to some embodiments, the tire sensor interrogation time instant may adapted to a time instant when the polarization loss for communication between the obtained relative tire sensor location and the tire sensor reader location is at, or about, a minimum. Since the tire sensor inside the tires may end up in different positions in which their antenna may not be in the most advantageous position for transmitting towards an antenna of an ECU's tire sensor reader, this may result in a polarization loss. However, since the tire sensors may comprise accelerometers for determining the speed and direction of rotation of a tire, this information together with the position of tire sensor inside the tire may be used in order to identify the most advantageous position of tire sensor that ensure minimum of polarization loss.

In some embodiments, the ECU may be arranged to configure each tire sensor to only transmit data to the ECU during the adapted tire sensor interrogation time instant for each tire sensor. This means the ECU may provide the tire sensors with instructions or commands as to when to transmit data towards the ECU's tire sensor reader, or relevant ECU tire sensor reader in case of a plurality of tire sensor reader locations, e.g. several range extenders.

According to some embodiments, the relative tire sensor location may be obtained based on information indicating the radial distance between a tire vertical and the tire sensor when the distance between the obtained relative tire sensor location and the tire sensor reader location is at, or about, a minimum. This is advantageous since the radial distance from a tire vertical to an origin of a vehicle coordinate system, e.g. origo, may be predetermined or registered in the ECU, thus the tire sensor location relative to other tire sensors and to the ECU's tire sensor reader is completely defined. Also, since this information may be registered in the ECU, and thus in the TPMS/THS system, it may be used for improving the TPMS/THS system operations.

In some embodiments, the information indicating the radial distance for a tire sensor may be manually configured in the ECU. Hence, the radial distance may be obtained manually directly from a user entering information into the ECU. Optionally, the information indicating the radial distance for a tire sensor may be received from a control unit in response to the vehicle traversing a sensor array arranged to communicate with the control unit. In this case, the radial distance may be obtained automatically from a control unit and a sensor array. In some embodiments, the tire sensors and the ECU may be part of a Tire Pressure Monitor System/Tire Health System, TPMS/THS, in a heavy-duty vehicle.

According to a second aspect of embodiments herein, the object is achieved by a method performed by an ECU for monitoring tire sensors in a vehicle. The method comprise obtaining a tire sensor location relative to a tire sensor reader location. The method also comprise adapting a tire sensor interrogation time instant based on the obtained relative tire sensor location.

In some embodiments, the tire sensor interrogation time instant may be adapted to a time instant when the distance between the obtained relative tire sensor location and the tire sensor reader location is at, or about, a minimum. Optionally, in some embodiments, the tire sensor interrogation time instant is adapted to a time instant when the polarization loss for communication between the obtained relative tire sensor location and the tire sensor reader location is at, or about, a minimum. The method may, according to some embodiments, comprise configuring each tire sensor to only transmit data to the ECU during the adapted tire sensor interrogation time instant for each tire sensor. In some embodiments, the relative tire sensor location is obtained based on information indicating the radial distance between a tire vertical and the tire sensor when the distance between the obtained relative tire sensor location and the tire sensor reader location is at, or about, a minimum. Here, the information indicating the radial distance for a tire sensor may be manually configured in the ECU according to some embodiments.

Optionally, the method may obtain the relative tire sensor location by receiving from a control unit, information indicating the radial distance for a tire sensor in response to the vehicle traversing a sensor array connected to the control unit.

According to a third aspect of the embodiments herein, the object is achieved by a computer program comprising instructions which, when executed in a processing circuitry, cause the processing circuitry to carry out the method described above. According to a fourth aspect of the embodiments herein, the object is achieved by a carrier containing the computer program described above, wherein the carrier is one of an electronic signal, optical signal, radio signal, or computer-readable storage medium. According to a fifth aspect of the embodiments herein, the object is achieved by a wheel arranged with a tire sensor, wherein the wheel comprise visual markings on the rim or tire of the wheel indicating the location of the tire sensor in order to provide a visual indication of a radial distance between a tire vertical and the tire sensor.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 5 is a flowchart illustrating embodiments of a method in a sensor array, FIG. 6 is a flowchart illustrating embodiments of a method in a control unit, FIG. 7 is a schematic view of a sensor array arranged to cylindrical rollers according to some embodiments.

DETAILED DESCRIPTION

Figure 1:
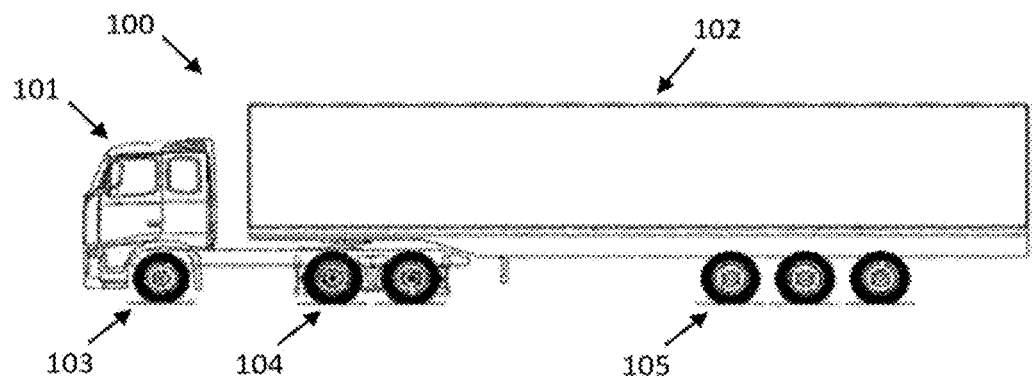
FIG. 1 is a side view of a vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description. It is to be understood that the present invention is not limited to the embodiments described herein and illustrated in the drawings; rather, the skilled person will recognize that many changes and modifications may be made within the scope of the appended claims.

Automatic Location of Transponders

According to some aspects of embodiments herein, a sensor array for locating tire sensors on a vehicle is provided. The sensor array is arranged to detect tire sensors on the vehicle as the tires of the vehicle traverses the sensor array. The sensor array is also arranged to identify each of the detected tire sensors on the vehicle. By having a sensor array arranged to be traversed, e.g. run over, by a vehicle such that the tire sensors of the tires may be read by the sensor array as the tire sensor passes in the vicinity of the sensors of the sensor array, the known location in the sensor array of the tire sensor detecting and identifying the tire sensor enable the tire position of the tire sensor on the vehicle to be automatically determined. Hence, no manual configuration or additional hardware is required for locating tire sensors on a vehicle.

In some embodiments, the sensor array may be configured to send, to a control unit, a signal indicating that one or more tire sensors on the vehicle has been detected and identified. Here, according to some embodiments, the signal comprise information indicating which sensor, or group of sensors, in the sensor array that has detected each of the tire sensors and the determined identities of each of the detected tire sensors. Optionally, according to some embodiments, the signal comprise information indicating tire sensor readings from detected and identified tire sensors in terms of tire pressure and tire temperature. This advantageously enable the control unit to determine the tire position on the vehicle where the tire sensor is located based on which sensor, or group of sensors, that has performed the detection and identification. It also allows the control unit to send this tire position to one or more ECUSs of vehicle, along with the identity of the tire sensor and additionally also the tire pressure and temperature readings of the tire sensor in some cases. In some embodiments, the sensor array is configured to receive an activation signal from the control unit in response to which the sensor array activates the detection of the tire sensors on the vehicle. This enables the control unit to effectively turn on the sensor array when a detection is to be made, for example, when a vehicle is approaching the sensor array. Here, according to some embodiments, the sensor array may comprise one or more vehicle detection sensors adapted to detect and send a signal to the control unit when a vehicle is about to traverse the sensor array. This enable the control unit to be informed about when a vehicle is approaching the sensor array and automatically turn on the sensor array. Optionally, in some embodiments, the sensor array may further be configured to remain in an idle mode in which only a determined subset of sensors in the sensor array is activated, and send a signal to the control unit as one or more sensors in the subset of sensors in the sensor array detects and identifies one or more tire sensors. In this case, the sensors in the sensor array may indicate when a vehicle is about to traverse the sensor array by detecting and identifying a first tire sensor.

According to some embodiments, the sensors in the sensor array are arranged into groups of sensors covering different surface areas, wherein the different surface areas are adapted to target different tires on the vehicle. This means that the sensor array may be adapted to detect and identify the tire sensors of any type of vehicle having any number of tires or sets of tires. For example, the sensor array may be arranged to detect and identify the tire sensors of dual tires on one side of the vehicle, and thus determine the tire position of both tires, e.g. which of the tires that is the inner wheel and which of the tires is the outer wheel. Here, according to some embodiments, the different surface areas may extend, in the direction in which the vehicle traverses the sensor array, for at least a distance that is equal to or exceeding an expected circumference of the different tires of the vehicle. This will guarantee that no tire sensor is unavailable for detection and identification, since it ensures that the each tire sensor at some point in time while the vehicle is traversing the sensor array will pass in the vicinity of the sensors of the sensor array and thus be detected and identified.

In some embodiments, the sensors in the sensor array may operate as Radio Frequency Identification, RFID, sensors and/or inductive charging sensors capable of interacting with the tire sensors on the vehicle. This means that if a tire sensors pass into the inductive or transmitting range of sensors of the sensor array, it will automatically be read by the sensors of the sensor array, i.e. identified and detected, and transfer its identity and readings via the sensor array to the control unit. According to some embodiments, the sensors in the sensor array may be planar loops antennas or coils having different sizes and arranged in one or more different layers. Optionally, in some embodiments, the sensor array is arranged to be positioned on or integrated into a ground surface. This means that the sensor array be integrated into a stationary position, such as, into a factory floor, maintenance hall floor, testing facility floor, etc. Alternatively, according to some embodiments, the sensor array is comprised in a movable ground surface cover configured to be traversed by the vehicle. This advantageously allows the sensor array to be flexibly moved to any type of location where location of tire sensors may suitably be determined. According to some embodiments, the sensor array comprise markers adapted to guide a driver, or autonomous driving system, of the vehicle when traversing the sensor array. By providing visual clear instructions to a driver of the vehicle on how the vehicle should traverse the sensor array in the most suitable way, a proper localization of the tire sensors on the vehicle may be ensured. In some embodiments, the sensor array is arranged in cylindrical rollers arranged to support the tires of the vehicle. This enables the vehicle to remain stationary, while the rotation of the cylindrical rollers on which the tires of the vehicle rests ensures that the tire sensors may be detected and identified by the sensors of the sensor array. Further, in some embodiments, the one or more tire sensors on the vehicle are Tire Pressure Monitor System, TPMS, or Tire Health System, THS, sensors.

According to some aspects of embodiments herein, a method for locating tire sensors on a vehicle using a sensor array is provided. The method comprises detecting tire sensors on the vehicle as the tires of the vehicle traverses the sensor array. The method also comprises identifying each of the detected tire sensors on the vehicle. According to some embodiments, the method further comprises sending, to a control unit, a signal indicating that one or more tire sensors on the vehicle has been detected and identified. Optionally, in some embodiments, the method may further comprise receiving an activation signal from the control unit in response to which the sensor array activates the detection of the tire sensors on the vehicle. Also, in some embodiments, the method may comprise sending a signal to the control unit when a vehicle is about to traverse the sensor array or when one or more sensors in a determined subset of sensors in the sensor array detects and identifies one or more tire sensors.

According to some aspects of embodiments herein, the object is achieved by a control unit for locating tire sensors on a vehicle, wherein the control unit is arranged to communicate with the sensor array and an electronic control unit, ECU, on-board the vehicle. The control unit is arranged to receive, from the sensor array, a signal indicating that tire sensors on the vehicle has been detected and identified. The control unit is also arranged to determine the tire position on the vehicle associated with each detected and identified tire sensor based on the obtained signal. Further, the control unit is arranged to transmit, to the ECU, information indicating the determined tire position on the vehicle for each detected and identified tire sensor. According to some embodiments, the signal may comprise information indicating which sensor, or group of sensors, in the sensor array that has detected each of the tire sensors and the determined identities of each of the detected tire sensors. Here, the control unit may, according to some embodiments, comprise a mapping associating each sensor, or group of sensors, in the sensor array with a tire position on the vehicle. Furthermore, in some embodiments, the signal may comprise information indicating tire sensor readings from detected and identified tire sensors in terms of tire pressure and tire temperature. In some embodiments, the control unit is further arranged to send an activation signal to the sensor array to initiate the detection of the tire sensors on the vehicle. Here, in some embodiments, the control unit is further arranged to send the activation signal in response to receiving a signal from the sensor array indicating that a vehicle is about to traverse the sensor array, or that one or more sensors in a determined subset of sensors in the sensor array has detected and identified one or more tire sensors.

According to some aspects of embodiments herein, a method performed by a control unit for locating tire sensors on a vehicle is provided, wherein the control unit is arranged to communicate with the sensor array an electronic control unit, ECU, on-board the vehicle. The method comprises receiving, from the sensor array, a signal indicating that tire sensors on the vehicle has been detected and identified. The method also comprises determining the tire position on the vehicle associated with each detected and identified tire sensor based on the obtained signal. The method further comprises transmitting, to the ECU, information indicating the determined tire position on the vehicle for each detected and identified tire sensor.

According to some embodiments, the signal may comprise information indicating which sensor, or group of sensors, in the sensor array that has detected each of the tire sensors and the determined identities of each of the detected tire sensors. Here, the determining of the tire positions may, according to some embodiments, comprise using a mapping comprised in the control unit associating each sensor, or group of sensors, in the sensor array with a tire position on the vehicle. Furthermore, in some embodiments, the signal may comprise information indicating tire sensor readings from detected and identified tire sensors in terms of tire pressure and tire temperature. In some embodiments, the method further comprises sending an activation signal to the sensor array to initiate the detection of the tire sensors on the vehicle. Here, in some embodiments, the activation signal in sent in response to receiving a signal from the sensor array indicating that a vehicle is about to traverse the sensor array, or that one or more sensors in a determined subset of sensors in the sensor array has detected and identified one or more tire sensors.

According to some aspect of the embodiments herein, the object is achieved by a computer program comprising instructions which, when executed in a processing circuitry, cause the processing circuitry to carry out the method described above. According to some aspects of the embodiments herein, a carrier containing the computer program described above is provided, wherein the carrier is one of an electronic signal, optical signal, radio signal or computer-readable storage medium. According to a seventh aspect of the embodiments herein, an arrangement comprising a sensor array as described above and/or a control unit as described above is provided.

FIG. 1 illustrates an example of a vehicle 100. In this case, the vehicle 100 is exemplified as a heavy-duty vehicle combination for cargo transport. The vehicle 100 in FIG. 1 comprises a truck or towing vehicle 101 configured to tow a trailer unit 102 in a known manner, e.g., by a fifth wheel connection. The vehicle 100 comprises wheels 103, 104, and 105. Herein, a heavy-duty vehicle is taken to be a vehicle designed for the handling and transport of heavier objects or large quantities of cargo. As an example, a heavy-duty vehicle could be a semi-trailer vehicle, or a truck as described above. As another example, a heavy-duty vehicle could be a vehicle designed for use in construction, mining operations, and the like. It is appreciated that the techniques and devices disclosed herein can be applied together with a wide variety of electrically powered vehicle units, not just those exemplified in FIG. 1. Thus, the techniques disclosed herein are also applicable to, e.g., rigid trucks and also multi-trailer electric heavy-duty vehicles comprising one or more dolly vehicle units.

Thus, even though the embodiments herein for locating tire sensors on a vehicle are described mainly with respect to heavy-duty vehicles, such as, e.g. semi-trailer vehicles or trucks for cargo transport, the embodiments herein should not be considered restricted to this particular type of vehicle but may also be used in other types of vehicles.

Figure 2:
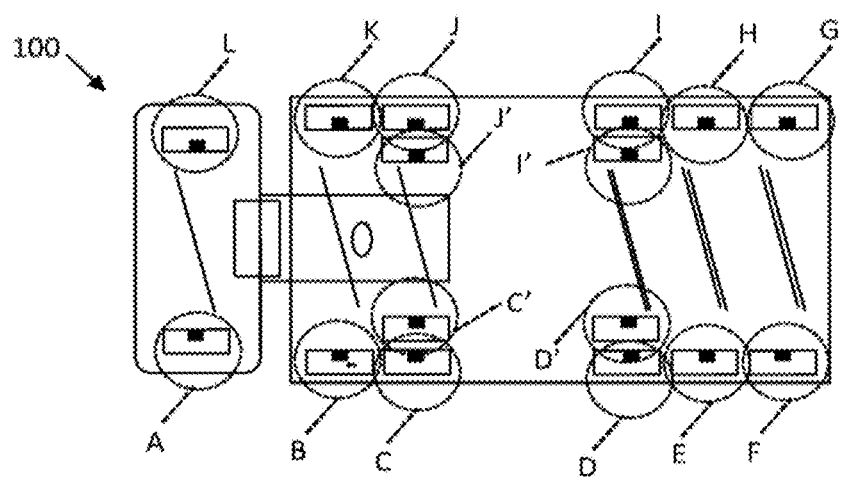
FIG. 2 is a schematic illustration of a vehicle and tire positions thereon.

FIG. 2 illustrates a first top-side view of the vehicle 100 and tire positions A-L thereon. In this example, the tire position A is the front left tire position of the truck or towing vehicle 101 of the vehicle 100, while the tire position L is the front right tire position of the truck or towing vehicle 101 of the vehicle 100. Furthermore, the tire positions of the trailer unit 102 ranges around the trailer unit 102 from the tire position B for the front left tire of the trailer unit 102 to the tire position K of the front right tire of the trailer unit 102. In some cases, certain tire positions may comprise a set of twin wheels as illustrated for the tire positions C, D, I, and J. In this case, the outermost tire position of the set of twin wheels is referred to as C, D, I, and J, respectively, while the innermost tire position of the set of twin wheels is referred to as C', D', I', and J'.

It should also be noted that the notation of the tire positions is merely made for sake of illustrative purposes to provide a clear and concise references to different tire positions; in other words, this notation should not be construed as limiting to the embodiments herein.

Figure 3:
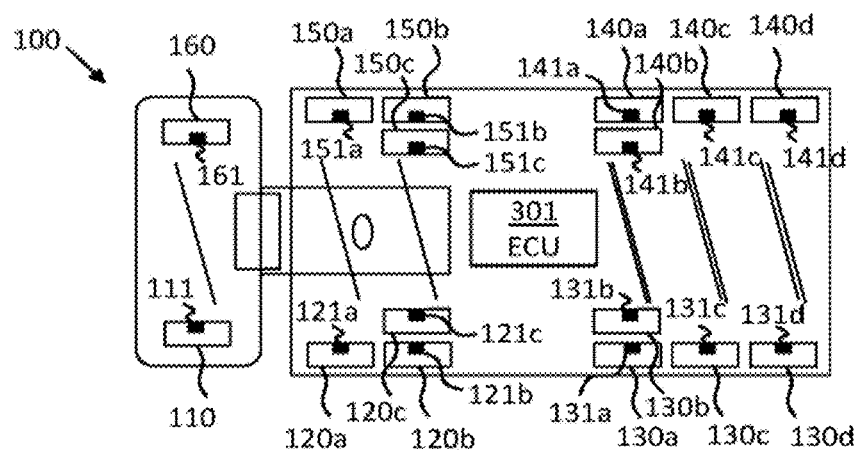
FIG. 3 is a schematic illustrations of a vehicle having tires comprising tire sensors at each tire position.

FIG. 3 illustrates a second top-side view of the vehicle 100 having tires 110, 120, 130, 140, 150, 160 comprising tire sensors 111, 121, 131, 141, 151, 161 at each tire position A-L on the vehicle 100 as described above in FIG. 2. The vehicle 100 further comprise an electronic control unit, ECU 301.

In this example, the tire 110 at the tire position A of the truck or towing vehicle 101 of the vehicle 100 comprise at least one tire sensor 111, while the tire 120 at the tire position L of the truck or towing vehicle 101 of the vehicle 100 comprise at least one tire sensor 121. Similarly, each tire 120a, 120b, 120c at the two front left tire positions B, C, C' of the trailer unit 102 of the vehicle 100 comprise each at least one tire sensor 121a, 121b, 121c, respectively. Also, each tire 130a, 130b, 130c, 130d at the three back left tire positions D, D', E, F of the trailer unit 102 of the vehicle 100 comprise each at least one tire sensor 131a, 131b, 131c, 131d, respectively. Furthermore, each tire 140a, 140b, 140c, 140d at the three back right tire positions I, I', H, G of the trailer unit 102 of the vehicle 100 comprise each at least one tire sensor 141a, 141b, 141c. Lastly, each tire 150a, 150b, 150c at the two front right tire positions K, J, J' of the trailer unit 102 of the vehicle 100 comprise each at least one tire sensor 151a, 151b, 151c.

The ECU 301 and each of the one or more tire sensors 111, 121, 131, 141, 151, 161 on the vehicle 100 may be part of an on-board Tire Pressure Monitor System/Tire Health System, TPMS/THS. In other words, the one or more tire sensors 111, 121, 131, 141, 151, 161 on the vehicle 100 may be TPMS/THS sensors, and the ECU 301 may be a TPMS/THS sensor reader. The one or more tire sensors 111, 121, 131, 141, 151, 161 on the vehicle 100 may also be referred to as TPMS/THS transponders and be arranged to use RFID.

As part of the developing of the embodiments described herein, it has been realized that ordinary TPMS/THS system on-board a vehicle 100 conventionally requires active driving on roads and reaching specific speeds, before all necessary tire sensor readings are obtained. This is due to the fact that TPMS/THS system also relies on speed sensor readings from, e.g. an on-board Automatic Brake System, ABS, system. This information is then combined with internal wheel speeds and rotation directions from accelerometer readings that may be integrated in tire sensors. This means, for example, that for a factory that mounts or installs the TPMS/THS system on the vehicle 100 for the first time, or an automotive workshop that mounts or installs new tires, will need to diagnose the TPMS/THS system in order to assess if the mounting/installation was successful. However, this confirmation will only be available after driving the vehicle 100 a certain period of time. According to the embodiments herein, this information may instead be obtained from a sensor array and a control unit as described below without any need for driving the vehicle 100.

Figure 4:
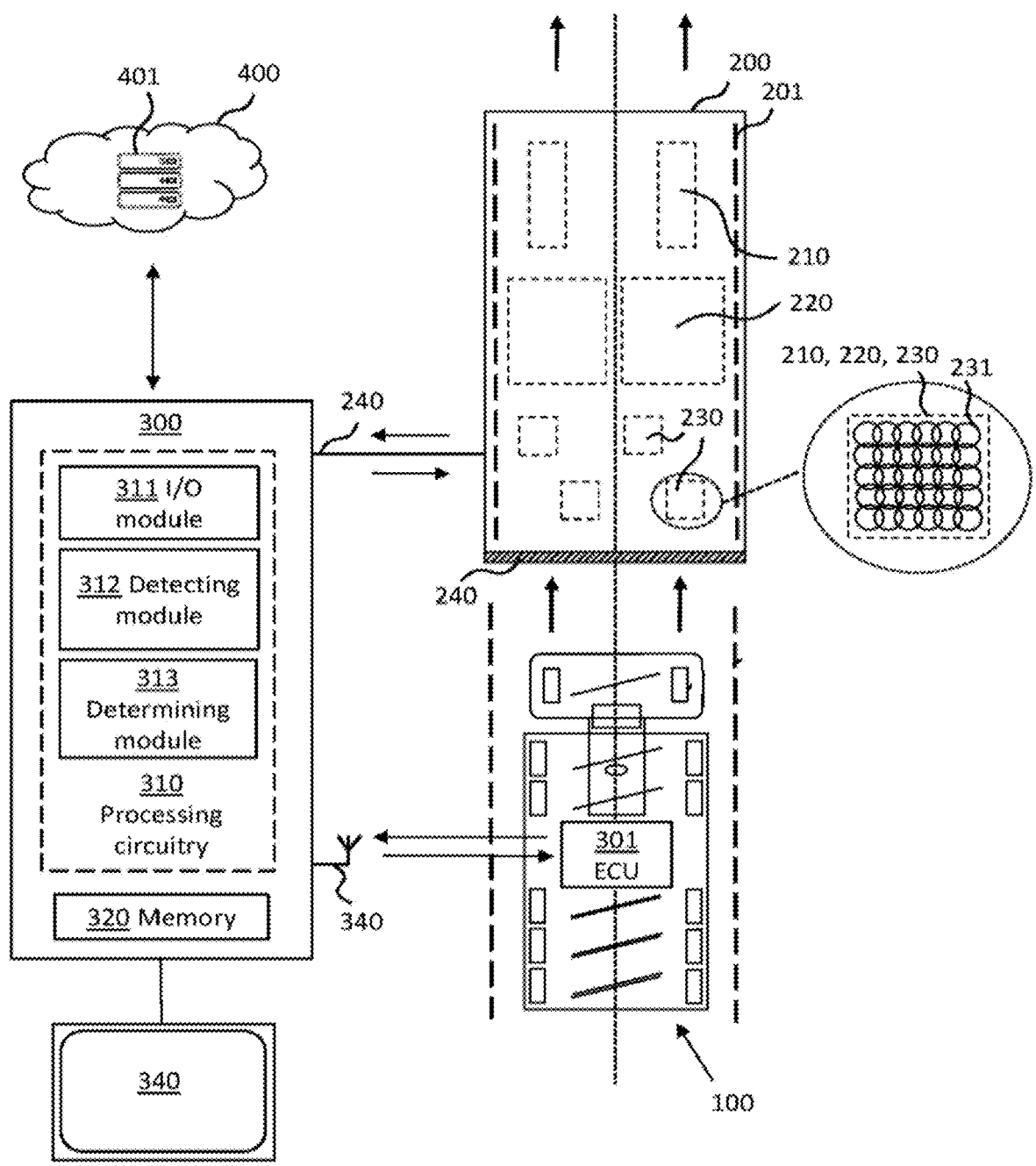
FIG. 4 is a schematic illustration of a sensor array, a control unit and a system according to some embodiments.

To perform the method actions for locating tire sensors 111, 121, 131, 141, 151, 161 on a vehicle 100 as described below with reference to FIG. 5-6, the sensor array 200 and the control unit 300 may form part of the following arrangement depicted in FIG. 4. FIG. 4 illustrates a sensor array 200 and a control unit 300 according to some embodiments.

FIG. 4 further shows a schematic view of a sensor array 300 according to some embodiments. The sensor array 200 is arranged to detect tire sensors 111, 121, 131, 141, 151, 161 on the vehicle 100 as the tires 110, 120, 130, 140, 150, 160 of the vehicle 100 traverses the sensor array 200, and identify each of the detected tire sensors 111, 121, 131, 141, 151, 161 on the vehicle 100. According to some embodiments, the sensor array 200 is configured to send, to the control unit 300, a signal indicating that one or more tire sensors 111, 121, 131, 141, 151, 161 on the vehicle 100 has been detected and identified. This signal may comprise the identity of the one or more detected and identified tire sensors 111, 121, 131, 141, 151, 161. Also, according to some embodiments, this signal may also comprise information indicating which sensor 231, or group of sensors 210, 220, 230, in the sensor array 200 that has detected each of the tire sensors 111, 121, 131, 141, 151, 161 and the determined identities of each of the detected tire sensors 111, 121, 131, 141, 151, 161. In some embodiments, the signal may further comprise information indicating sensor readings from the sensor 231, or group of sensors 210, 220, 230, in the sensor array 200 in terms of tire pressure and tire temperature. The latter is possible since ISO 18000 series of RFID standards cover the same frequencies as used by tire sensors 111, 121, 131, 141, 151, 161 to send pressure and temperature readings. Therefore, the sensor array 200 may be used to also obtain the tire sensor readings, and not only their identification and tire position.

The sensor array 200 may comprise a large number of sensors 231. The sensors 231 may be arranged into groups of sensors 210, 220, 230 in the sensor array 200. The groups of sensors 210, 220, 230 may also be referred to as sensor sub-arrays. Each group of sensors 210, 220, 230 may cover different surface areas or measurement zones, where each group of sensors 210, 220, 230 may be adapted to target different tires 110, 120, 130, 140, 150, 160 on the vehicle 100. The different surface areas are denoted by the dashed lined areas of the sensor array 200 in FIG. 4. In other words, different measurement areas or zones may be defined above the sensor array 200. As seen in FIG. 4, one set of measurement areas/zones may on the left side on the sensor array 200, and another set of measurement areas/zones may on the right side. In some embodiments, some measurement areas/zones may be defined in order to separately read twin tires, such as, the tires 120b-120c, 130a-120b, 140a-140b or 150b-120c on the vehicle 100 in FIG. 3. These measurement areas/zones may be are defined in such a way that a tire or twin tire from a twin mount on the vehicle 100 may only be closest to its planned measurement areas/zones on the sensor array 200. These measurement areas/zones may, for example, be a bit smaller, e.g. have same width as a tire with some additional margins around it, as compared other measurement areas/zones of the sensor array 200. By combining information regarding which measurement areas/zones the tire 110, 120, 130, 140, 150, 160 entered and respective tire sensor identification readings, automatic location of the tire sensors 111, 121, 131, 141, 151, 161 is achieved.

Furthermore, some of the group of sensors 210, 220, 230 may also be arranged to detect the same tires for redundancy purposes. According to some embodiments, each surface area comprising groups of sensors 210, 220, 230 may extend in the direction in which the vehicle 100 traverses the sensor array 200. The groups of sensors 210, 220, 230 may extend for at least a distance equal to or exceeding an expected circumference of the different tires 110, 120, 130, 140, 150, 160 of the vehicle 100. The direction in which the vehicle 100 traverses the sensor array 200 is indicated by the fully drawn arrows before and after the sensor array 200 in FIG. 4.

As described above, the groups of sensors 210, 220, 230 in the sensor array 200 may be arranged to form different sensor clusters in order to generate a multitude of surface areas or measuring zones above surface of the sensor array 200. As the one or more tire sensors 111, 121, 131, 141, 151, 161 on the vehicle 100 pass through one of the surface areas or measuring zones of the sensor array 200, the tire sensors 111, 121, 131, 141, 151, 161 may induce a electro-magnetic field inside the sensor coils or planar loops of the sensor array 200. This may create a signal capable of transferring information from the tire sensors 111, 121, 131, 141, 151, 161 to the sensor array 200. The information from the tire sensors 111, 121, 131, 141, 151, 161 may comprise the respective identity of the tire sensors 111, 121, 131, 141, 151, 161, but may also, according to some embodiments, comprise information indicating tire sensor readings from detected and identified tire sensors 111, 121, 131, 141, 151, 161 in terms of tire pressure and tire temperature.

Each of the sensors 231 in the sensor array 200 may operate as Radio Frequency Identification, RFID, sensors (such as, e.g. Near Field Communication, NFC, sensors) and/or inductive charging sensors capable of interacting with the tire sensors 111, 121, 131, 141, 151, 161 on the vehicle 100. The sensors 231 in the sensor array 200 may, for example, be planar loops antennas or coils having different sizes and arranged in one or more different layers. In other words, the sensors 231, or the groups of sensors 210, 220, 230, in the sensor array 200 may serve as an initiator or initiating device providing a carrier field towards a target device, e.g. a tire sensor 111, 121, 131, 141, 151, 161. The target device may then communicate back by modulating the incident field. Here, the target device, i.e. a tire sensor 111, 121, 131, 141, 151, 161, may draw its operating power from the initiator-provided electromagnetic field, e.g. an electromagnetic field generated by the sensors 231, or the groups of sensors 210, 220, 230, in the sensor array 200. Thus, the sensors 231, or the groups of sensors 210, 220, 230, in the sensor array 200 and the tire sensor 111, 121, 131, 141, 151, 161 may be regarded as two loop antennas, which use inductive coupling between each other and therefore effectively form a core transformer.

It should also be noted that the sensor array 200 may be arranged to be positioned on or integrated into a ground surface. In this case, it should also be noted that since the ground surface or floor may be conductive, an additional ferrite material may be provided beneath the sensor array and the ground surface or floor. According to one example, the sensor array 200 may be built into the floor of a factory of the vehicle 100. For example, once a TPMS/THS system and transponders, i.e. the ECU 301 and the tire sensors 111, 121, 131, 141, 151, 161, are installed, the vehicle 100 may drive over the sensor array 200 to get an initial tire sensor reading as the tire sensors 111, 121, 131, 141, 151, 161, rotate above the sensor array 200. According to another example, the sensor array 200 may be built into the floor of the automotive dealer or workshop. When one or more tires 110, 120, 130, 140, 150, 160 have been replaced, or radiated, the vehicle 100 may drive over the sensor array 200 to get new tire sensor readings, i.e. auto-locate the tire sensors 111, 121, 131, 141, 151, 161 anew, and recalibrate the on-board TPMS/THS system. According to a further example, the sensor array 200 may be built into the floor of a weight station or Weight-in-Motion, WIM, station. WIM stations may, for example, be available in Europe after regulation according to EU-directive 2015/719 is implemented. The weight stations may measure the weight loads of commercial vehicles to ensure a proper weight load for vehicle 100. Upon providing on-board weight information to the on-board TPMS/THS system of the vehicle 100, the sensor array 200 could also be used in order to recommend a certain tire pressure for a specific carried weight load. Optionally, the sensor array 200 may be comprised in a movable ground surface cover configured to be traversed by the vehicle 100. For example, the sensor array 200 may be a large film which quickly and easily may be rolled out on a concrete floor inside or outside any factory, station, automotive dealer, automotive workshop, etc.

The sensor array 200 may also comprise markers 201 adapted to guide a driver, or autonomous driving system, of the vehicle 100 when traversing the sensor array 200. Also, in case of an autonomous vehicle traversing the sensor array 200, the camera sensors on the autonomous vehicle may be used in order to read the markers 201 and to guide the autonomous vehicle through the testing zone of the sensor array 200.

The sensor array 200 may also comprise one or more vehicle detection sensor 240 adapted to detect and send a signal to the control unit 300 when a vehicle 100 is about to traverse the sensor array 200. Optionally, the sensor array 200 may be connected to an external vehicle detection sensor (not shown). For example, in some cases the ECU 301 on-board the vehicle 100 may need to initiate a system check before the tire sensors 111, 121, 131, 141, 151, 161 start sending back their sensor readings. The tire sensors 111, 121, 131, 141, 151, 161 might not be activated before that. Therefore, sensor array 200 may be enable to activate tire sensors 111, 121, 131, 141, 151, 161 of the vehicle 100 independently of that. This may, for example, be performed by integrating one or more vehicle detection sensors 240 in the sensor array 200 in order to indicate that a vehicle is about to pass, i.e. traverse the sensor array 200. These sensors may, for example, be pressure or laser sensors 240 located before the sensors 231, or group of sensors 210, 220, 230, in the direction in which the vehicle 100 traverses the sensor array 200. The sensor array 200 may then start sending out signals via its sensors 231, or group of sensors 210, 220, 230, in order to make the tire sensors 111, 121,131, 141, 151, 161 on the vehicle 100 respond. Optionally, the sensor array 200 may be in an idle mode and activate only some of its sensors 231, or group of sensors 210, 220, 230, for example, at determined time intervals. Thus, as soon as the active sensors 231, or active group of sensors 210, 220, 230, in the sensor array 200 detect a reading from a tire sensor 111, 121, 131, 141, 151, 161, the sensor array 200 may activate all the sensors 231, or all the group of sensors 210, 220, 230, in the entire sensor array 200. Thus, according to some embodiments, the sensor array 200 may be configured to receive an activation signal from the control unit 300 in response to which the sensor array 200 activates the detection of the tire sensors 111, 121, 131, 141, 151, 161 on the vehicle 100. In some embodiments, the sensor array 200 may be configured to receive an activation signal from the control unit 300 in response to which the sensor array 200 activates the detection of the tire sensors 111, 121, 131, 141, 151, 161 on the vehicle 100. Here, according to some embodiments, the sensor array 200 may also be configured to remain in an idle mode in which only a determined subset of sensors in the sensor array 200 is activated, and send a signal to the control unit 300 as one or more sensors in the subset of sensors in the sensor array 200 detects and identifies one or more tire sensors 111, 121, 131, 141, 151, 161. This means that the one or more vehicle detection sensor 240 may be implemented via some of the sensors 231, or group of sensors 210, 220, 230, in the sensor array 200. In this case, these sensors 231, or group of sensors 210, must be located before the rest of the sensors 231, or group of sensors 210, in the direction in which the vehicle 100 traverses the sensor array 200 as shown in FIG. 4.

The sensor array 200 may also be arranged to communicate with a control unit 300. This may, for example, be performed via an electrical connection 240 adapted to transmit analogue electrical signals to and/or from each of the sensors 231, or groups of sensors 210, 220, 230, in the sensor array 200. However, it should be noted that other types of communication between the sensor array 200 and the control unit 300 may also be implemented, such as, e.g. via wireless communication protocol, for transferring signals between the sensor array 200 and the control unit 300. This is, however, not described in any further detail herein.

It should also be noted tires 110, 120, 130, 140, 150, 160 alone also may have RFID tags or sensors for tire identification that is separate from the tire sensors 111, 121, 131, 141, 151, 161. Here, it should be noted that the sensor array 200 may be used also for detecting the identity of the tire, e.g. tire ID. Further, the sensor array 200 may be used also for pairing the identity of the tire, e.g. tire ID, with the identity of the tire sensor, e.g. tire sensor ID. Also, in case of having other sensor IDs, such as for example, separate pressure and temperature sensors, the sensor array 200 may also be used for pairing these with the tire ID/tire sensor IDs. In other words, the pairing of the different RFID tags or sensors may be performed automatically as the vehicle 100 traverses the sensor array 200 as described above.

FIG. 4 further also shows a schematic view of a control unit 300 according to some embodiments. The control unit 300 is arranged to communicate with the sensor array 200 as described above, and an electronic control unit, ECU 301, on-board the vehicle 100. The control unit 300 may comprise a processing circuitry 310 and a computer readable storage unit or memory 320. The processing circuitry 310 may be arranged to execute instructions stored in the computer readable storage unit 320. The control unit 300 may also, for example, be connected to a display interface 330 for communicating with a user of the arrangement 200, 300. The display interface 330 may, for example, be an interactive touch display or a display connected to keyboard providing user input capabilities.

The control unit 300 and/or processing circuitry 310 may further comprise an Input/Output, I/O, module 311, a detecting module 312 and a determining module 313. Here, the I/O module 311 may comprise a communication interface that enable the control unit 300 and/or processing circuitry 310 to communicate and exchange signals with the sensor array 200. For example, the I/O module 311 may comprise an AD converter (not shown) for transforming analogue electrical signals from the sensor array 200 into a digital format for processing by the control unit 300 and/or processing circuitry 310. Also, the I/O module 311 may also comprise a wireless communication interface that enables the control unit 300 and/or processing circuitry 310 to communicate with the ECU 301 on-board the vehicle 100. For this purpose, the control unit 300 may also comprise an antenna 340. Further, the I/O module 311 may also comprise a communication interface that enables the control unit 300 and/or processing circuitry 310 to communicate an online server or cloud server 401 in a communications network 400, such as, e.g. the Internet. Furthermore, the I/O module 311 may comprise a display interface and a user interface that enables the control unit 300 and/or processing circuitry 310 to communicate with a user of the control unit 300 and sensor array 200, e.g. via the display interface 310.

The control unit 300 or processing circuitry 310 is configured to, or may comprise the I/O module 311 configured to, receive, from the sensor array 200, a signal indicating that tire sensors 111, 121, 131, 141, 151, 161 on the vehicle 100 has been detected and identified. Also, the control unit 300 or processing circuitry 310 is configured to, or may comprise the determining module 312 configured to, determine the tire position A-L on the vehicle 100 associated with each detected and identified tire sensor 111, 121, 131, 141, 151, 161 based on the obtained signal. Further, the control unit 300 or processing circuitry 310 is configured to, or may comprise the I/O module 311 configured to, transmit, to the ECU 301, information indicating the determined tire position A-L on the vehicle 100 for each detected and identified tire sensor 111, 121, 131, 141, 151, 161.

In some embodiments, the signal comprise information indicating which sensor 231, or group of sensors 210, 220, 230, in the sensor array 200 that has detected each of the tire sensors 111, 121, 131, 141, 151, 161 and the determined identities of each of the detected tire sensors 111, 121, 131, 141, 151, 161. Also, in some embodiments, the signal may further comprise information indicating tire sensor readings from detected and identified tire sensors 111, 121, 131, 141, 151, 161 in terms of tire pressure and tire temperature. Here, in some embodiments, the control unit 300 or processing circuitry 310 may comprise, or may comprise the determining module 312 comprising, a mapping associating each sensor 231, or group of sensors 210, 220, 230, in the sensor array 200 with a tire position A-L on the vehicle 100.

In some embodiments, the control unit 300 or processing circuitry 310 may be configured to, or may comprise the I/O module 311 configured to, send an activation signal to the sensor array 200 to initiate the detection of the tire sensors 111, 121, 131, 141, 151, 161 on the vehicle 100. Here, according to some embodiments, the control unit 300 or processing circuitry 310 may be configured to, or may comprise the I/O module 311 configured to, send the activation signal in response to receiving a signal from the sensor array 200 indicating that a vehicle 100 is about to traverse the sensor array 200, or that one or more sensors in a determined subset of sensors in the sensor array 200 has detected and identified one or more tire sensors 111, 121, 131, 141, 151, 161.

Furthermore, the embodiments for locating tire sensors 111, 121, 131, 141, 151, 161 on a vehicle 100 described above may be at least partly implemented through one or more processors, such as, the processing circuitry 310 in the control unit 300 depicted in FIG. 4, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 310 in the control unit 300. The data carrier, or computer readable medium, may be one of an electronic signal, optical signal, radio signal, or computer-readable storage medium. The computer program code may e.g. be provided as pure program code in the control unit 300 or on a server and downloaded to the control unit 300. Thus, it should be noted that the control unit 300 may in some embodiments be implemented as computer programs stored in memory, e.g. in the computer readable storage unit 320 in FIG. 4, for execution by processors or processing modules, e.g. the processing circuitry 310 in the control unit 300 in FIG. 4.

Those skilled in the art will also appreciate that the processing circuitry 310 and the computer readable storage unit 320 described above may refer to a combination of analog and digital circuits, and/or one or more processors configured with software and/or firmware, e.g. stored in a memory, that when executed by the one or more processors such as the processing circuitry 310 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Examples of embodiments of a method for locating tire sensors 111, 121, 131, 141, 151, 161 on a vehicle 100 using a sensor array 200, will now be described with reference to the flowchart depicted in FIG. 5. FIG. 5 is an illustrated example of actions, steps or operations which may be performed the sensor array 100 as described above with reference to FIG. 4. The method may comprise the following actions, steps or operations.

Action 501. Optionally, in some embodiments, the sensor array 200 may send a signal to the control unit 300 when a vehicle 100 is about to traverse the sensor array 200 or when one or more sensors in a determined subset of sensors in the sensor array 200 detects and identifies one or more tire sensors 111, 121, 131, 141, 151, 161. Here, for example, the one or more vehicle detection sensors 240 may be used to determined when a vehicle 100 is about to traverse the sensor array 200. Optionally, the one or more vehicle detection sensors 240 may be implemented by a determined subset of the sensors 231, or group of sensors 210, 220, 230, in the sensor array 200. According to another option, the sensor array 200 may also be arranged to be connected to one or more external vehicle detection sensors, such as, a standalone pressure or laser sensors.

Action 502. According to some embodiments, the sensor array 200 may receive an activation signal from the control unit 300 in response to which the sensor array 200 may activate the detection of the tire sensors 111, 121, 131, 141, 151, 161 on the vehicle 100. This activation signal may, for example, be a on or off signal from the control unit 200, e.g. based on user input. Optionally, this activation signal may, for example, be received in response to the signal sent in Action 501.

Action 503. The sensor array 200 detects the tire sensors 111, 121, 131, 141, 151, 161 on the vehicle 100 as the tires 110, 120, 130, 140, 150, 160 of the vehicle 100 traverses the sensor array 200. This means that, as the tires 110, 120, 130, 140, 150, 160 of the vehicle 100 rolls over the sensor array 200, the tire sensors 111, 121, 131, 141, 151, 161 on the vehicle 100 will pass closely over the sensors 231, or group of sensors 210, 220, 230, e.g. through the electromagnetic fields generated by the sensors 231, or group of sensors 210, 220, 230. Thus, the tire sensors 111, 121, 131, 141, 151, 161 on the vehicle 100 will be detectable by the sensors 231, or group of sensors 210, 220, 230, of the sensor array 200.

Action 504

As the tire sensors 111, 121, 131, 141, 151, 161 on the vehicle 100 is detected in Action 503, the sensor array 200 identifies each of the detected tire sensors 111, 121, 131, 141, 151, 161 on the vehicle 100. Each of the detected tire sensors 111, 121, 131, 141, 151, 161 will generate unique signal in the respective sensors 231, or group of sensors 210, 220, 230, of the sensor array 200 that detected it. The signal will comprise information regarding the identity of the detected tire sensor 111, 121, 131, 141, 151, 161. According to some embodiments, the signal may also comprise information indicating tire sensor readings from detected and identified tire sensors 111, 121, 131, 141, 151, 161 in terms of tire pressure and tire temperature.

Action 505

After detecting and identifying the tire sensors 111, 121, 131, 141, 151, 161 in Actions 503-504, the sensor array 200 may send, to a control unit 300, a signal indicating that one or more tire sensors 111, 121, 131, 141, 151, 161 on the vehicle 100 has been detected and identified. This signal may the same as the signal described above in Action 504.

Examples of embodiments of performed by a control unit 300 for locating tire sensors 111, 121, 131, 141, 151, 161 on a vehicle 100, wherein the control unit 300 is arranged to communicate with a sensor array 200 and an electronic control unit, ECU, 301 on-board the vehicle 100, will now be described with reference to the flowchart depicted in FIG. 6. FIG. 6 is an illustrated example of actions, steps or operations which may be performed by the control unit 300 as described above with reference to FIG. 4. The method may comprise the following actions, steps or operations.

Action 601. Optionally, according to some embodiments, the control unit 300 may send an activation signal to the sensor array 200 to initiate the detection of the tire sensors 111, 121, 131, 141, 151, 161 on the vehicle 100. This may, for example, be an on/off signal to the sensor array 200. In some embodiments, the activation signal may be sent in response to receiving a signal from the sensor array 200 indicating that a vehicle 100 is about to traverse the sensor array 200, or that one or more sensors in a determined subset of sensors in the sensor array 200 has detected and identified one or more tire sensors 111, 121, 131, 141, 151, 161.

Action 602

The control unit 300 receive, from the sensor array 200, a signal indicating that tire sensors 111, 121, 131, 141, 151, 161 on the vehicle 100 has been detected and identified. Here, the signal may comprise information indicating which sensor 231, or group of sensors 210, 220, 230, in the sensor array 200 that has detected each of the tire sensors 111, 121, 131, 141, 151, 161 and the determined identities of each of the detected and identified tire sensors 111, 121, 131, 141, 151, 161. Thus, the control unit 300 is informed about the identity of each detected and identified tire sensor 111, 121, 131, 141, 151, 161 and about which sensor 231, or group of sensors 210, 220, 230, in the sensor array 200 that detected and identified each of tire sensor 111, 121, 131, 141, 151, 161. According to some embodiments, the signal may further comprise information indicating tire sensor readings from detected and identified tire sensors 111, 121, 131, 141, 151, 161 in terms of tire pressure and tire temperature.

Action 603

After receiving the signal from the sensor array 200 in Action 602, the control unit 300 determines the tire position A-L on the vehicle 100 associated with each detected and identified tire sensor 111, 121, 131, 141, 151, 161 based on the received signal. Here, in some embodiments, this may be performed by using a mapping comprised in the control unit 300 associating each sensor 231, or group of sensors 210, 220, 230, in the sensor array 200 with a tire position A-L on the vehicle 100.

Action 604

After the determination in Action 603, the control unit 300 transmits, to the ECU 301, information indicating the determined tire position A-L on the vehicle 100 for each detected and identified tire sensor 111, 121, 131, 141, 151, 161. Hence, the ECU 301 is informed about which tire sensor 111, 121, 131, 141, 151, 161 is located at which tire position A-L on the vehicle 100. This means, for example, that the on-board TPMS/THS system, of which the ECU 301 may be a part of, is informed about which tire sensor 111, 121, 131, 141, 151, 161 is located at which tire position A-L on the vehicle 100.

FIG. 7 illustrates the sensor array 200 arranged on or in cylindrical rollers 710, 720 arranged to support the tires 110, 120, 130, 140, 150, 160 of the vehicle 100 according to some embodiments. Here, it should be noted that, in some embodiments, the sensor array 200 may be built into any form of rotating means, such as, e.g. the cylindrical rollers 710, 720, adapted to carry the vehicle 100 while rotating the tires 110, 120, 130, 140, 150, 160 of the vehicle 100. Here, the sensor array 200 may be arranged around the rotating means as shown in FIG. 7. For example, the rotating means could be used to run speed test inside a test chamber or during balancing a wheel at an automotive workshop.

It should further be noted that, similarly as described above for tire sensors, the same application of transponders, as used for the tire sensors 111, 121, 131, 141, 151, 161, may also be used for other purposes in a similar manner. For example, the sensor array 200 may be provide at a battery exchange station wherein an automatic battery exchange is performed on the vehicle 100. In this case, the one or more batteries in the vehicle 100 may have transponders, similar to the tire sensors 111, 121, 131, 141, 151, 161 as described herein, mounted on them in pre-determined and well-known positions on the vehicle 100. This means that, since the position of these transponders may be determined with an accuracy of down to a few millimetres by the sensor array 200, the information from the sensor array 200 may, for example, be used to control and adjust one or more robot arms that is exchanging the battery in an accurate and precise manner.

Optionally, in some embodiments, the sensor array 200 may be integrated with coils or sensors that also may be used to, e.g. perform inductive charging of batteries on-board the vehicle 100. In this case, the coils or sensors used for charging could also be used in order to read and position the tire sensors 111, 121, 131, 141, 151, 161.

Algorithm for Learning and Calibrating a Sensor Array

According to another aspect, it is also an object of embodiments herein to provide a control unit and a method therein, along with computer program products and carriers, for detecting and identifying tire sensors on a vehicle using a sensor array that seeks to mitigate, alleviate, or eliminate all or at least some of the above-discussed drawbacks of presently known solutions in the background part.

According to one aspect of embodiments herein, the object is achieved by a method for detecting and identifying tire sensors on a vehicle using a sensor array. The method comprises calibrating the sensor array by moving one or more tire sensors about the sensor array, or vice versa, whereby the sensor array detects and identifies the one or more tire sensors. The method also comprises using the calibration data of the sensor array upon performing the detection and identification of the tire sensors on the vehicle as the tires of the vehicle traverses the sensor array.

By moving the one or more tire sensors in a tire about the sensor array, or moving the sensor array about the one or more tire sensors in the tire (i.e. vice versa), a control unit using the sensor array is able to be calibrated for the specific tire/tire sensor constellation of a certain tire prior to installation, i.e. before starting to position tire sensors in a vehicle using the sensor array. The positioning is then performed in the same commonly defined coordinate system for the tire sensor and the sensor array.

According to some embodiments, the one or more tire sensor may be moved across the sensor array, or the sensor array may be moved around the tire sensor, according to different predetermined tire orientations and tire sensor locations in the tire. This means, for example, that a robot arm holding a tire comprising one or more tire sensors may move the tire such that the tire sensors located at different positions in the tire is motioned above the sensors array in a number of different possible positions as the tire sensor might read inside a specific tire. The sensors in the senor array may thus interrogating tire sensors, which may respond back like a transponder as described in above with reference to FIG. 4. The sensor in the sensor array may also register the signals originating from the tire sensors by being in different positions, for example, by register the electromagnetic fields that are induced in the sensors of the sensor array by the tire sensors by being moved about in different positions in the vicinity of the sensors of the sensor array. This signals may then be sent to the control unit in which they may be digitized and stored. This calibration data may thus be used to calibrate real tire sensor measurements by the sensor array and the control unit.

According to some embodiments, the method comprises comparing the calibration data of the sensor array with data obtained from the sensor array when detecting and identifying tire sensors on the vehicle in order to adapt the operation of the sensor array. This means that when an actual tire sensor measurements is performed by the sensor array and the control unit, the control unit may perform a comparison of the actual tire sensor measurements with the calibration data obtained prior to installation of the sensor array and control unit. Here, optionally, the method may comprise a machine learning model that is trained to determine tire identification information based on the calibration data of the sensor array and the data obtained from the sensor array when detecting and identifying tire sensors on the vehicle. For example, calibration data relating to a large number of different tires with a large number of different possible tire sensors and tire sensor positions may be collected and used to train a machine learning model, such as, e.g. a neural network model, to recognize certain tire identification information. According to another option, a look-up table or lists may be used by the control unit in the comparison for determining the tire identification information.

In some embodiments, the tire identification information may here comprise the identity of tire sensors, and/or the identity of a vendor or Original Equipment Manufacturer, OEM, associated with the identified tire sensors. This means that as a vehicle traverses the sensor array, the control unit may determine the tire identification information based on the actual sensor measurements of the sensor array and the calibration data. According to some embodiments, the data obtained from the sensor array when detecting and identifying tire sensors on the vehicle may also comprise local sensor information associated with the time of detecting and identifying tire sensors on the vehicle by the sensor array, wherein the sensor information comprise one or more of: a local temperature value, a local humidity value, and a local resistance value. This means that specific conditions at the time of the sensor measurements at the location of the sensor array may be registered and comprised in the calibration data.

Also, in some embodiments, the method may comprise transmitting the calibration data of the sensor array and data obtained from the sensor array when detecting and identifying tire sensors on the vehicle to a central server. In this case, the central server may store the calibration data of the sensor array, as well as, the data obtained from the sensor array when detecting and identifying tire sensors on the vehicle.

According to an aspect of the embodiments herein, the object is achieved by a control unit arranged to communicate with a sensor array, wherein the control unit is configured to perform the method as described above. According to an aspect of the embodiments herein, the object is achieved by a computer program comprising instructions which, when executed in a processing circuitry, cause the processing circuitry to carry out the method described above. According to an aspect of the embodiments herein, the object is achieved by a carrier containing the computer program described above, wherein the carrier is one of an electronic signal, optical signal, radio signal, or computer-readable storage medium.

Figure 8:
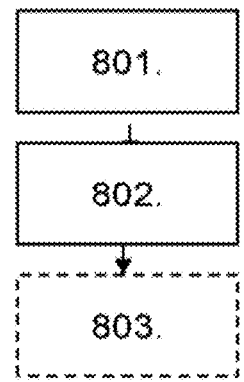
FIG. 8 is a flowchart illustrating embodiments of a calibration method of a sensor array.

Examples of embodiments for detecting and identifying tire sensors 111, 121, 131, 141, 151, 161 on a vehicle 100 using a sensor array 200, will now be described with reference to the flowchart depicted in FIG. 8. FIG. 8 is an illustrated example of actions, steps or operations which may be performed by a control unit 300 arranged to communicate with a sensor array 200, as described above with reference to FIG. 4. The method may comprise the following actions, steps or operations.

Action 801. The control unit 300 calibrates the sensor array 200 by moving one or more tire sensors A, A', A" about the sensor array 200, or vice versa, whereby the sensor array 200 detects and identifies the tire sensor A, A', A". Here, the one or more tires sensors A, A', A" may be any one of the tire sensors 111, 121, 131, 141, 151, 161 in the same tire 110, 120, 130, 140, 150, 160 on the vehicle 100. In some embodiment, the one or more tire sensors A, A', A" may be moved across the sensor array 200, or the sensor array 200 is moved around the one or more tire sensors A, A', A", according to different predetermined tire orientations 1101-1104 and tire sensor locations in the tires 110, 120, 130, 140, 150, 160.

Figure 9:
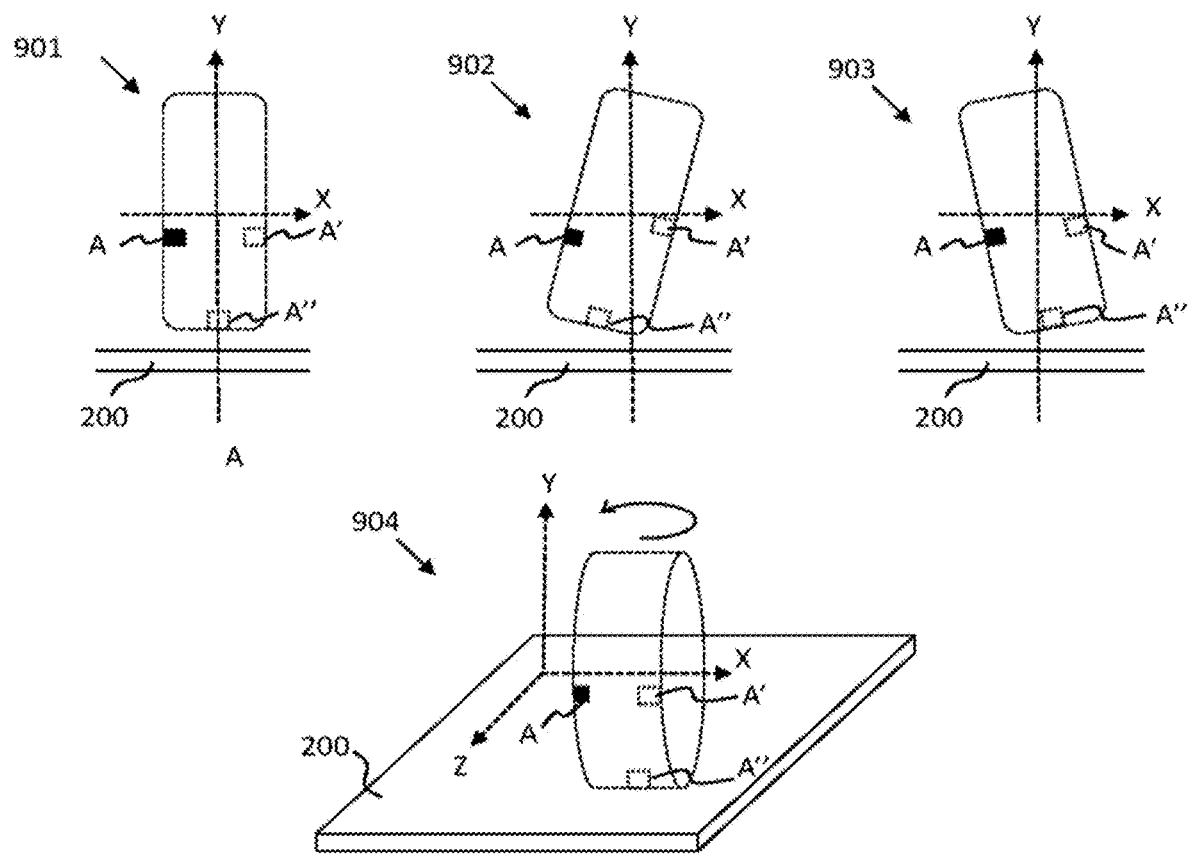
FIG. 9 is a schematic illustrations of different predetermined tire orientations according to some embodiments.

The different predetermined tire orientations 901-904 and tire sensor locations of the one or more tire sensors A, A', A" is illustrated in FIG. 9. By placing one or more tire sensor A, A', A" in different positions about the sensor array 200, it is possible for the control unit 300 to determine the position of the one or more tire sensor A, A', A" with millimeter accuracy. Thus, when a tire with one or more tire sensors in similar tire sensor positions inside the tire is passing over the sensor array 200, the positions of the one or more tire sensor A, A', A" may be determined with an accuracy of millimetres. This info may be provided in a sensor array coordinate system X, Y, Z. When the vehicle 100 is passing over the sensor array 200, the vehicle coordinate system may be matched to the sensor array coordinate system X, Y, Z. In this sense, tire sensor position of the tire sensor A, A', A" may be consider known also in the vehicle coordinate system.

For example, one or more robotic arm or similar may be arranged above or nearby the sensor array 200. These robotic arms may hold a tire comprising the one or more tire sensors A, A', A" and move tire about, i.e. around and above, the sensor array 200. Optionally, the one or more robotic arms may be arranged to hold the sensor array 200 and move the sensor array about, i.e. around and above, the tire and the one or more tire sensors A, A', A". This means that all sensors of the sensor array 200 for which the tire sensors A, A', A" comes in a close enough vicinity of will register a signal. The robotic arms may operate in same coordinate system X, Y, Z as the sensor array 200, which means that each tire sensor position x, y, z and angle positions of the one or more tire sensors A, A', A" will be known in the coordinate system X, Y, Z. This information may then be combined with the signals received by each sensor in the sensor array 200.

Action 802. After the calibration in Action 801, the control unit 300 may use the calibration data of the sensor array 200 upon performing the detection and identification of the tire sensors 111, 121, 131, 141, 151, 161 on the vehicle 100 as the tires 110, 120, 130, 140, 150, 160 of the vehicle 100 traverses the sensor array 200. This means that, after the calibration and as a vehicle 100 is traverses the sensor array 200, the sensors in the sensor array 200 may again register a signal and then use the calibration data to perform the detection and identification of the tire sensors 111, 121, 131, 141, 151, 161.

According to some embodiments, the control unit 300 may compare the calibration data of the sensor array 200 with data obtained from the sensor array 200 when detecting and identifying tire sensors 111, 121, 131, 141, 151, 161 on the vehicle 100 in order to adapt the operation of the sensor array 200. This may, for example, mean that by comparing the signals from the sensor array 200, i.e. the data obtained from the sensor array 200 when detecting and identifying tire sensors 111, 121, 131, 141, 151, 161, with the signals registered by the sensor of the sensor array 200 during the calibration, i.e. the calibration data of the sensor array 200, and finding the closest match, the control unit 300 is able to estimate the tire sensor positions x, y, z and angles of the tire sensors A, A', A" inside a tire in the coordinate system X, Y, Z.

In some embodiments, the control unit 300 may comprise a machine learning model that is trained to determine tire identification information based on the calibration data of the sensor array 200 and the data obtained from the sensor array 200 when detecting and identifying tire sensors 111, 121, 131, 141, 151, 161 on the vehicle 100. Here, according to some embodiments, the tire identification information may comprise the identity of tire sensors 111, 121, 131, 141, 151, 161, and/or the identity of a vendor or Original Equipment Manufacturer, OEM, associated with the identified tire sensors 111, 121, 131, 141, 151, 161. This information may then be used by the control unit 300 to adapt the operation of the sensor array 200, such as, e.g. increasing/decreasing a power level of the sensors in the sensor array 200 in order to improve the ability of the sensor array 200 to detect a specific vendor/OEM of a tire.

Action 803

Optionally, in some embodiments, the control unit 300 may transmit the calibration data of the sensor array 200 and data obtained from the sensor array 200 when detecting and identifying tire sensors 111, 121, 131, 141, 151, 161 on the vehicle 100 to a central server 401. Here, the central server may store the calibration data of the sensor array 200, as well as, the data obtained from the sensor array 200 when detecting and identifying tire sensors 111, 121, 131, 141, 151, 161 on the vehicle 100. In other words, by being moved about in different locations and reading the one or more tire sensor 111, 121, 131, 141, 151, 161 of different vendors, the sensor array 200 may, for example, send its daily readings to a central server 401. This may, for example, be performed in order to report back to a central service in which conditions the test/calibration of the sensor array 200 was performed. In this way, a central server 401, such as, e.g. a cloud or online server, may continuously be provided with this information, and may use this information in order to optimize for different environmental conditions, such as, e.g. snow, rain, mud, etc., or to the one or more tire sensor 111, 121, 131, 141, 151, 161 of different vendors.

In some embodiments, the data obtained from the sensor array 200 when detecting and identifying tire sensors 111, 121, 131, 141, 151, 161 on the vehicle 100 may also comprise local sensor information associated with the time of detecting and identifying tire sensors 111, 121, 131, 141, 151, 161 on the vehicle 100 by the sensor array 200, wherein the sensor information comprise one or more of: a local temperature value, a local humidity value, and a local resistance value. This means that specific conditions at the time of the sensor measurements at the location of the sensor array 200 may be registered and comprised in the calibration data.

Furthermore, the embodiments for detecting and identifying tire sensors 111, 121, 131, 141, 151, 161 on a vehicle 100 using a sensor array 200 described above may be at least partly implemented through one or more processors, such as, the processing circuitry 310 in the control unit 300 depicted in FIG. 4, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 310 in the control unit 300. The data carrier, or computer readable medium, may be one of an electronic signal, optical signal, radio signal or computer-readable storage medium. The computer program code may e.g. be provided as pure program code in the control unit 300 or on a server and downloaded to the control unit 300. Thus, it should be noted that the control unit 300 may in some embodiments be implemented as computer programs stored in memory, e.g. in the computer readable storage unit 320 in FIG. 4, for execution by processors or processing modules, e.g. the processing circuitry 310 in the control unit 300 in FIG. 4.

Optimization of Transponder Reading

Figure 10:
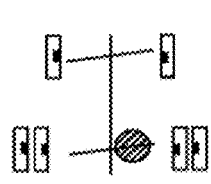
FIG. 10 show schematic illustrations of ECUs and range extenders on different types of vehicles according to some embodiments.
Figure 10:
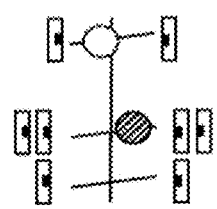
Figure 10:
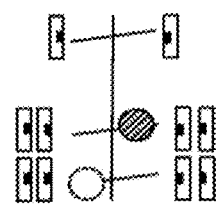
Figure 10:
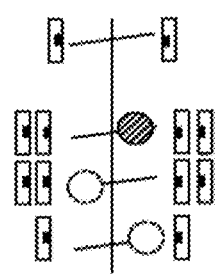
Figure 10:
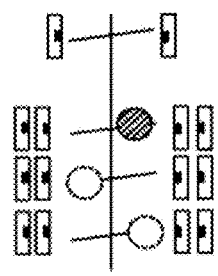
Figure 10:
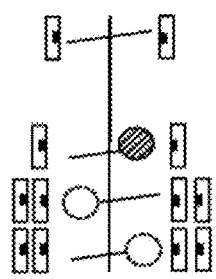
Figure 10:
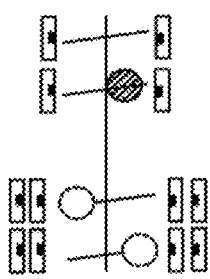
Figure 10:
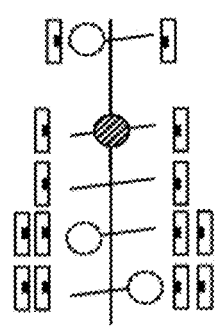
Figure 10:
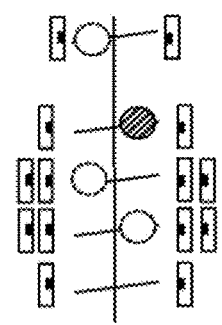
Figure 10:
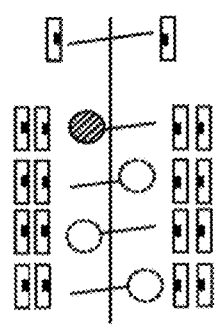
Figure 10:
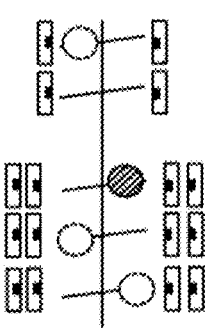

FIG. 10 illustrate different ECU tire sensor reader locations on a vehicle 100 according to some embodiments. A tire sensor reader of the ECU 301 may be co-located with the ECU 301 or located at a different location that the ECU 301 on the vehicle 100. These locations are denoted by the dashed circles in the example vehicles A-K in FIG. 10. However, in for example long heavy-duty trucks or trailers, several range extenders may be used by the ECU to obtain a suitable coverage of all tire sensors 111, 121, 131, 141, 151, 161 on the vehicle 100. Thus, there may be more than one tire sensor reader connected to an ECU 301. These additional locations are denoted by the empty circles in the example vehicles A-K in FIG. 10. Although the locations of the tire sensor readers illustrated in FIG. 10 for different example vehicles A-K may be advantageous for obtaining a suitable coverage of all tire sensors 111, 121, 131, 141, 151, 161 on the vehicle 100, this should not be construed as limiting for the embodiments described herein.

Figure 11:
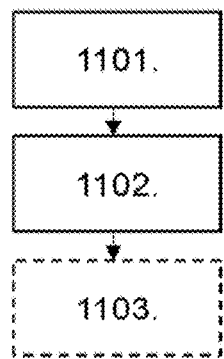
FIG. 11 is a schematic illustration of a tire sensor location relative to a tire sensor reader location according to some embodiments.

Examples of embodiments performed by electronic control unit, ECU 301, for monitoring tire sensors 121$b$, 121$b'$, 131$d$ in a vehicle 100, will now be described with reference to the flowchart depicted in FIG. 11. FIG. 11 is an illustrated example of actions, steps or operations which may be performed by an ECU 301 on-board the vehicle 100. The method may comprise the following actions, steps or operations.

Figure 13:
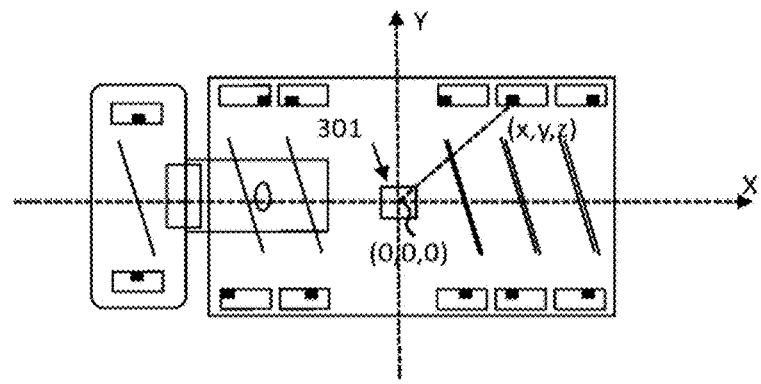
Figure 12:
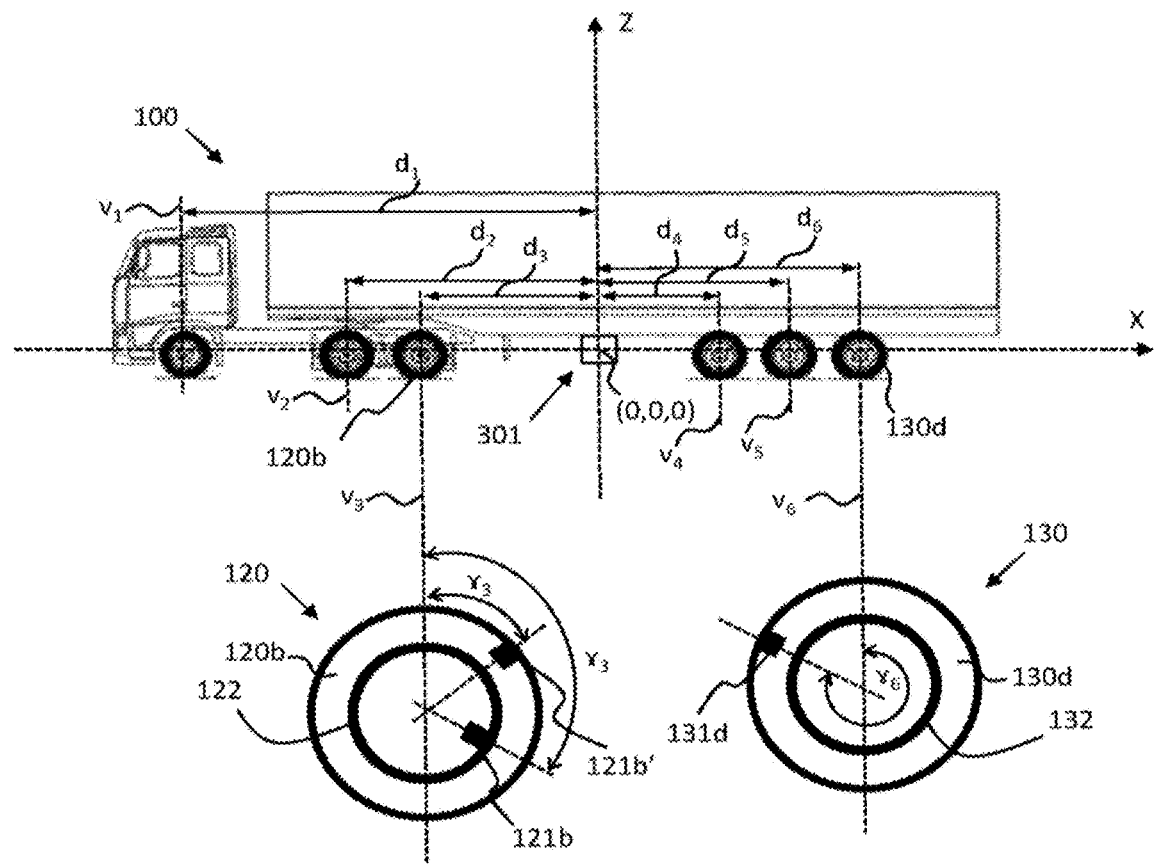
FIG. 12 is a flowchart illustrating embodiments of a method in an ECU.

Action 1101. The ECU 301 obtains a tire sensor location $d_3$, $r_3$, $d_6$, $r_6$ relative to a tire sensor reader location 301. Here, the tire sensor reader location 301 may, for example, an origin of a vehicle coordinate system (0, 0, 0) as shown in FIGS. 12-13.

In some embodiments, the relative tire sensor location $r_3$, 76 may be obtained based on information indicating the radial distance $r_3$, 76 between a tire vertical $v_3$, $v_6$ and the tire sensor 121$b$, 121$b'$, 131$d$ when the distance between the obtained relative tire sensor location $r_3$, $r_6$ and the tire sensor reader location 301 is at, or about, a minimum. In some embodiments, the information indicating the radial distance $r_3$, $r_6$ for a tire sensor 121$b$, 121$b'$, 131$d$ may be manually configured in the ECU 301. For example, this means that manual input of the tire sensors relationship to each other and to the ECU 301 may be used. As shown in FIGS. 12-13, one example of a vehicle coordinate system may located the ECU 301 at its origin. The tire sensors, such as, e.g. tire sensor 120$b$, 121$b'$, 130$d$, may be mounted and located in the tires 120$b$, 130$d$ according to instructions. For example, the tire sensors 121$b$, 121$b'$, 131$d$ are usually mounted inside or outside on the rim of the tire 120$b$, 130$d$ or built into the tire 120$b$, 121$b'$, 130$d$. The tire 120$b$, 130$d$ may then be mounted on the rim.

According to some embodiments, in order to assist in the manual reading of the relative tire sensor location, a wheel 120, 130 arranged with a tire sensor 121$b$, 121$b'$, 131$d$, wherein the wheel 120, 130 comprise visual markings on the rim 122, 132 or tire 120$b$, 130$d$ indicating the location of the tire sensor 121$b$, 121$b'$, 131$d$, in order to provide a visual indication of a radial distance $r_3$, 76 between a tire vertical $v_3$, $v_6$ and the tire sensor 121$b$, 121$b'$, 131$d$, may be provided. In this case, the visual markings may be indicated on the tires 120$b$, 130$d$ or the rims 122, 132 in order to have visual information regarding where the tire sensor 121$b$, 121$b'$, 131$d$ is located. For tire sensors built into a tire, these type of visual markings may be provided by default. When the tire 120$b$, 130$d$ is mounted onto the chassis of the vehicle 100, angles or coordinates of the tire sensors 121$b$, 121$b'$, 131$d$ may be manually read based on these visual markings.

Optionally, in some embodiments, the ECU 301 may receive the information indicating the radial distance $r_3$, 76 for a tire sensor 121$b$, 121$b'$, 131$d$ in response to the vehicle 100 traversing a sensor array 200 arranged to communicate with the control unit 300. For example, this means that an automatic determination of the tire sensors relationship to each other and to the ECU 301 may be used.

After completed mounting of the tires 120$b$, 130$d$ comprising the tire sensors 121$b$, 121$b'$, 131$d$, on the vehicle 100, the vehicle may traverse a sensor array 200 as described above. It is thus possible to position the tire sensors 121$b$, 121$b'$, 131$d$ within vehicle coordinate system, and determine the relationship between the tire sensors 121$b$, 121$b'$, 131$d$ and ECU 301. For example, as the tires 120$b$, 130$d$ are rotating, the measurement areas/zones of the sensor array 200 may be adapted or created such that its middle coincide with the lowest position of the tire sensor 121$b$, 121$b'$, 131$d$ in the tire 120$b$, 130$d$ and the surface of sensor array 200. By determining the relationship between the middle of such adapted or created measurement areas/zones of the sensor array 200, information is obtained regarding the relationship between the tire sensors 121$b$, 121$b'$, 131$d$ and ECU 301.

Action 1102. After obtaining the tire sensor location $d_3$, $r_3$, $d_3$, $r_6$, the ECU 301 adapts a tire sensor interrogation time instant $t_3$, $t$& based on the obtained relative tire sensor location $d_3$, $r_3$, $d_6$, $r_6$. According to some embodiments, the tire sensor interrogation time instant $t_3$, $t_6$ is adapted to a time instant when the distance between the obtained relative tire sensor location $d_3$, $r_3$, $d_6$, $r_6$ and the tire sensor reader location 301 is at, or about, a minimum. Optionally, according to some embodiments, the tire sensor interrogation time instant $t_3$, $t_6$ is adapted to a time instant when the polarization loss for communication between the obtained relative tire sensor location $d_3$, $r_3$, $d_6$, $r_6$ and the tire sensor reader location 301 is at, or about, a minimum.

Action 1103. Optionally, the ECU 301 may configure each tire sensor 120$b$, 130$d$ to only transmit data to the ECU 101 during the adapted tire sensor interrogation time instant $t_3$, $t$ for each tire sensor 120$b$, 130$d$. This means, for example, that the tire sensors 121$b$, 121$b'$, 131$d$ may get instructions to broadcast their tire sensor readings only when, e.g. the shortest radial distance between the tire sensors 121$b$, 121$b'$, 131$d$ and ECU 301 occurs.

FIG. 12-13 illustrate a vehicle coordinate system wherein the location of the tire sensor reader of the ECU 301 is the origin, i.e. origo. The location of the tire sensor reader of the ECU 301 is, in this example, the same as the location of the ECU 301.

The vehicle coordinate system may be registered in the ECU 301, wherein the relationship between the tire verticals $v_{1-6}$, e.g. the tire verticals $v_3$, $v_6$ for the tires 120$b$, 130$d$, and the location of the tire sensor reader of the ECU 301 may be predetermined or predefined. This may, for example, be obtained by using the distances $d_{1-6}$ between the location of the tire sensor reader of the ECU 301 and the tire verticals $v_{1-6}$, as well as, the distance of each tire on the Y-axis from the X-axis (as shown in FIG. 13). This means that by determining the position of the tire sensors relative to its tire vertical, respectively, the position of the tire sensors relative to the location of the tire sensor reader of the ECU 301 may be obtained.

For example, by determining the radial distance $r_3$, $r_3$ between the tire sensor 121b, 121b' and the tire vertical $v_3$, the position of the tire sensors 121b, 121b' relative to the location of the tire sensor reader of the ECU 301 may be obtained. Similarly, by determining the radial distance $r_6$ between the tire sensor 131d and the tire vertical $v_6$, the position of the tire sensors 131d relative to the location of the tire sensor reader of the ECU 301, e.g. (0, 0, 0) in the vehicle coordinate system, may be obtained.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

The invention claimed is:

1. An electronic control unit, ECU, for monitoring at least two tire sensors in at least two tires in a vehicle, wherein the ECU is arranged to obtain a tire sensor location of each of the at least two tire sensors relative to a tire sensor reader location on-board the vehicle, and adapt a tire sensor interrogation time instant of each of the at least two tire sensors based on the obtained relative tire sensor location of each of the at least two tire sensors.

2. The ECU according to claim 1, wherein the tire sensor interrogation time instant is adapted to a time instant when the distance between the obtained relative tire sensor location and the tire sensor reader location is at, or about, a minimum.

3. The ECU according to claim 1, wherein the tire sensor interrogation time instant is adapted to a time instant when the polarization loss for communication between the obtained relative tire sensor location and the tire sensor reader location is at, or about, a minimum.

4. The ECU according to claim 1, wherein the ECU is further arranged to configure each tire sensor to only transmit data to the ECU during the adapted tire sensor interrogation time instant for each tire sensor.

5. The ECU according to claim 1, wherein the relative tire sensor location is obtained based on information indicating the radial distance between a tire vertical and the tire sensor when the distance between the obtained relative tire sensor location and the tire sensor reader location is at, or about, a minimum.

6. The ECU according to claim 5, wherein the information indicating the radial distance for a tire sensor is manually configured in the ECU.

7. The ECU according to claim 5, wherein the information indicating the radial distance for a tire sensor is received from a control unit in response to the vehicle traversing a sensor array arranged to communicate with the control unit.

8. The ECU according to claim 1, wherein the tire sensors and the ECU are part of a Tire Pressure Monitor System, TPMS, arrangement on a heavy-duty vehicle.

9. A method performed by electronic control unit, ECU, for monitoring at least two tire sensors in at least two tires in a vehicle, wherein the method comprises:
   obtaining a tire sensor location of each of the at least two tire sensors relative to a tire sensor reader location on-board the vehicle; and
   adapting a tire sensor interrogation time instant of each of the at least two tire sensors based on the obtained relative tire sensor location of each of the at least two tire sensors.

10. The method according to claim 9, wherein the tire sensor interrogation time instant is adapted to a time instant when the distance between the obtained relative tire sensor location and the tire sensor reader location is at, or about, a minimum.

11. The method according to claim 9, wherein the tire sensor interrogation time instant is adapted to a time instant when the polarization loss for communication between the obtained relative tire sensor location and the tire sensor reader location is at, or about, a minimum.

12. The method according to claim 9, further comprising configuring each tire sensor to only transmit data to the ECU during the adapted tire sensor interrogation time instant for each tire sensor.

13. The ECU according to claim 9, wherein the relative tire sensor location is obtained based on information indicating the radial distance between a tire vertical and the tire sensor when the distance between the obtained relative tire sensor location and the tire sensor reader location is at, or about, a minimum.

14. The ECU according to claim 13, wherein information indicating the radial distance for a tire sensor is manually configured in the ECU.

15. The ECU according to claim 13, wherein the obtaining further comprises receiving from a control unit, information indicating the radial distance for a tire sensor in response to the vehicle traversing a sensor array connected to the control unit.

16. A non-transitory computer program medium comprising program code for performing the steps of claim 9 when said program code is run on a computer or on processing circuitry of an electronic control unit, ECU.

17. A computer program carrier carrying a computer program according to claim 16, wherein the computer program carrier is a computer-readable storage medium.

* * * * *